(12) United States Patent
Martin et al.

(10) Patent No.: US 9,755,264 B2
(45) Date of Patent: Sep. 5, 2017

(54) METHOD FOR THE PRODUCTION OF AN ALL-SOLID BATTERY

(71) Applicant: COMMISSARIAT A L'ENERGIE ATOMIQUE ET AUX ENE ALT, Paris (FR)

(72) Inventors: Steve Martin, Saint Sauveur (FR); Messaoud Bedjaoui, Voreppe (FR); Sylvain Poulet, Saint Victor de Cessieu (FR); Jouhaiz Rouchou, Saint Egreve (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/360,356

(22) PCT Filed: Nov. 23, 2012

(86) PCT No.: PCT/EP2012/073497
§ 371 (c)(1),
(2) Date: May 23, 2014

(87) PCT Pub. No.: WO2013/076260
PCT Pub. Date: May 30, 2013

(65) Prior Publication Data
US 2014/0325832 A1    Nov. 6, 2014

(30) Foreign Application Priority Data

Nov. 24, 2011 (FR) ..................... 11 60740

(51) Int. Cl.
*H01M 10/04* (2006.01)
*H01M 10/0525* (2010.01)
(Continued)

(52) U.S. Cl.
CPC ....... *H01M 10/04* (2013.01); *H01M 10/0525* (2013.01); *H01M 10/0562* (2013.01);
(Continued)

(58) Field of Classification Search
CPC ..................................................... H01M 10/04
See application file for complete search history.

(56) References Cited

U.S. PATENT DOCUMENTS 6,528,344 B2    3/2003  Kang
2004/0258984 A1   12/2004  Ariel et al.
(Continued)

FOREIGN PATENT DOCUMENTS

WO    2004/093223         10/2004
WO    WO 2010007722 A1 *  1/2010   ............. H01M 8/02
WO    2010/035197          4/2010

OTHER PUBLICATIONS

International Search Report Issued Dec. 19, 2012 in PCT/EP12/073497 Filed Nov. 23, 2012.
(Continued)

*Primary Examiner* — Patrick Ryan
*Assistant Examiner* — Zhongqing Wei
(74) *Attorney, Agent, or Firm* — Oblon, McClelland, Maier & Neustadt, L.L.P.

(57) ABSTRACT

A method for the production of a battery includes at least production, against a substrate made of a material able to form an electrode, of at least one solid electrolyte layer, production of a first electrode in contact with the electrolyte, and thinning the substrate such that at least a remaining proportion of the substrate, in contact with the solid electrolyte layer, forms a second electrode.

11 Claims, 3 Drawing Sheets

(51) Int. Cl.
*H01M 10/0562* (2010.01)
*H01M 10/0585* (2010.01)
*H01M 4/38* (2006.01)
*H01M 4/48* (2010.01)
*H01M 4/505* (2010.01)
*H01M 4/525* (2010.01)

(52) U.S. Cl.
CPC ........ *H01M 10/0585* (2013.01); *H01M 4/382* (2013.01); *H01M 4/483* (2013.01); *H01M 4/505* (2013.01); *H01M 4/525* (2013.01); *Y10T 29/49115* (2015.01)

(56) References Cited

U.S. PATENT DOCUMENTS

| | | |
|---|---|---|
| 2009/0057136 A1 | 3/2009 | Wang et al. |
| 2010/0239907 A1 | 9/2010 | Izumi |
| 2011/0143250 A1 | 6/2011 | Takata et al. |
| 2011/0177396 A1 | 7/2011 | Moriwaka et al. |

OTHER PUBLICATIONS

French Search Report Issued Jul. 2, 2012 in French Patent Application No. 1160740 Filed Nov. 24, 2011.
U.S. Appl. No. 14/422,255, filed Feb. 18, 2015, Martin.
Combined Chinese Office Action and Search Report issued Nov. 25, 2015 in Patent Application No. 201280067678.0 (with English language translation and English translation of categories of documents).

* cited by examiner

METHOD FOR THE PRODUCTION OF AN ALL-SOLID BATTERY

TECHNICAL FIELD

The invention relates to the field of solid electrolyte batteries, called all-solid batteries. The invention relates more specifically to the architecture of this type of batteries and of their methods of production. The invention can advantageously be used to manufacture a battery or a microbattery.

STATE OF THE PRIOR ART

The characteristic of an all-solid battery or microbattery, in the sense understood in the present document, relates to the fact that it includes at least one solid electrolyte inserted between two electrodes. The superposition of these three layers, in solid form, forms an electrochemical cell which is less than approximately 15 µm thick, for example of the order of about ten microns, in the case of microbatteries.

When ions migrate between the two electrodes, more specifically from the anode to the cathode, the electrochemical cell generates electricity. The electrolyte is permeable to this ion flow, and electronically insulates the electrodes to prevent the electrochemical cell being short-circuited.

The solid electrolyte constitutes an insulating material which is more effective than one in liquid form. For example, an electrolyte made from solid LiPON is characterised by an insulation of less than $10^{-13}$ S/cm.

Conventionally, batteries are manufactured using technologies borrowed from microelectronics. They are produced by successive deposits of thin layers, consisting of materials the intrinsic properties of which determine their function. The deposit techniques generally used are of the following types: PVD, CVD, PECVD, Spin Coating, Electrodepositon, Sol-Gel, Spray coating, other coating techniques, etc. More specifically, the electrolyte of this type of battery is produced by vacuum deposit techniques, such as, for example, magnetron sputtering. This type of technique enables thin layers to be formed which are less than one micron thick but, for several reasons described in the part below, the solid electrolytes are currently greater than one micron thick.

The qualities of the electrolyte, as an electronic insulant, depend among other factors on its homogeneity. If it includes discontinuities such as, for example, faults or flaws 4, electrical charges can move and traverse electrolyte 3 along these faults (FIG. 1a). This phenomenon of electronic leaks then reduces the level of energy stored in the battery, and the term used is a "self-discharge phenomenon".

These flaws appear in particular during the formation of electrolyte layer 3. This layer is deposited, using one of the above techniques, on a thin layer 2 used subsequently as an electrode, and lying on a substrate 1.

The homogeneity of a thin layer depends, among other factors, on the surface condition of its support. If this support is rough or has strong relief, many flaws are created during the first instants of the deposit, and more specifically during the first nanometers deposited.

The solution currently consists in depositing sufficient material to cover or fill all the flaws and, by this means, in limiting their effects (FIG. 1b).

To fill in or up the flaws of the thin layers more material must be deposited. And the surface condition or the roughness of a thin layer is more difficult to control when it is made thicker. In other words, the thicker a thin layer the greater its surface roughness (RMS>1 nm) (FIG. 1a).

In an all-solid battery the upper layers therefore have more flaws. It is consequently difficult to stack several fine, flawless layers, to produce a thin all-solid battery.

The electrolyte of this type of battery must currently have a minimal thickness, greater than one micron, to limit the effects of the flaws, and to insulate electronically the anode and the cathode in a satisfactory manner. And the internal resistance of an electrochemical cell is proportional to the thickness of its electrolyte. Batteries currently therefore have limited performance characteristics when they are operating with high power ratings or strong currents, due to the thickness of electrolyte required to fill the flaws.

The storage capacity of a battery also depends on the thickness of these electrodes.

Increasing the storage capacity of a battery requires that the thickness of the electrodes is increased, and therefore the thickness of its electrolyte.

It is therefore difficult to produce an all-solid battery or microbattery which has at once a high energy storage capacity (thick electrodes) and viable operation with high power ratings (thin electrolyte).

DESCRIPTION OF THE INVENTION

The purpose of the present application is to provide at least one solution to the following problem: how to produce an all-solid battery, for example a microbattery, containing a thin electrolyte, which is of satisfactory quality in terms of electronic insulation.

To this end, the present invention relates to a method for the production of an all-solid battery or microbattery, including at least the following steps:
  production against a substrate made of an active material of at least one solid electrolyte layer;
  production of a first electrode in contact with the electrolyte;
  thinning of the substrate, such that at least a remaining proportion of the substrate, in contact with the solid electrolyte layer, forms a second electrode.

One of the benefits of the invention is therefore that it is possible to produce uniform solid electrolyte layers, from smaller thicknesses, since it is then no longer necessary to deposit an additional thickness of electrolyte to fill the flaws due to the surface roughnesses of its support. For equivalent electronic insulation performance characteristics, the present application enables thinner thicknesses of electrolyte to be deposited compared to the state of the art.

According to the present application an "active material" designates a material capable of forming an electrode, or of being used as such, in a battery of the all-solid type, enabling atoms or ions to be inserted.

In other words, the substrate is of a conducting or semi-conducting nature, and can incorporate external elements. These elements can be atoms or ions, of the following types: H, or Li, or Be, or Mg, or Na or K. Another role of the substrate is that it acts as a mechanical support during the formation of the solid electrolyte layer, of the first electrode, and possibly of other layers. To provide this support function, the thickness of the substrate is preferably greater than 10 µm.

After the thinning step, the portion of the substrate in contact with the solid electrolyte layer forming the second electrode can be less than or equal to approximately one tenth of the initial thickness of the substrate. This thickness is preferably less than 10 µm, for example between 10 nm and 9 µm, or between 100 nm and 1 µm.

The substrate can be produced from at least one of the following elements: silicon, germanium and carbon.

An electrochemical cell according to the present application includes at least the first electrode, the electrolyte layer and the second electrode. The cell can be between 100 nm and 100 µm thick.

The electrolyte layer can include one or more of the following materials: LiPON, LLTO, LISIPON, LISON.

The first electrode can be manufactured from one or more of the following elements: lithium, $LiCoO_2$, $LiMn_2O_4$, $V_2O_5$, $LiV_2O_5$.

The electrochemical cell can be covered, at least partially, by a covering or protective material, which can form a diffusion barrier to water vapour.

The covering material can be either an electrically insulating material, which covers the electrochemical cell entirely, or alternatively an electrically conductive material.

The electrically insulating material can thus encapsulate the electrochemical cell.

The electrically conductive material advantageously does not entirely cover the electrochemical cell, to prevent a short circuit of the battery or microbattery being created. It can possibly be held against the electrochemical cell, by an intermediate layer made of an anisotropic conductive material. This layer can be of the ACF or ACP type.

At least two different vias are produced in the covering material, as far as the first and second electrodes. The vias can be filled up or in, by an electrically conductive material.

Electrical connections can then be soldered on to at least one of the above electrically conductive materials.

The production method can include:
a step of formation of an embrittlement zone in the substrate, including one or more ionic and/or atomic species, delimiting the second electrode in the substrate;
a step of separation of the second electrode from a remaining portion of the substrate, by splitting, along this embrittlement zone.

The portion of the substrate detached from the second electrode, which is therefore no longer in contact with the solid electrolyte layer, can advantageously be used once again as a substrate, possibly after a step of preparation of one of its surfaces.

The embrittlement zone can be formed before or, alternatively, after the production of the solid electrolyte layer on the substrate made of an active material or able to form an electrode. The step of separation is preferably implemented after the formation of the electrolyte and of the first electrode.

This embrittlement zone can be produced by a technique of ion or atom implantation or, alternatively, by a technique of diffusion of ions originating or deriving from the first electrode.

The ion implantation technique can consist in implanting identical atoms or ions, such as for example hydrogen ions, at an equal depth.

Ion diffusion can be accomplished by bringing the first electrode into contact with the substrate, by current-conducting means. These means can include a conductive wire and an electrical voltage generator. An electrical voltage is preferably applied between these two elements, to encourage ions to migrate from the first electrode into the substrate.

According to one variant, the step of thinning of the substrate can be implemented by splitting and/or polishing and/or laser cutting and/or cutting by water jet and/or wet and/or dry etching.

The polishing and/or cutting and/or etching can advantageously enable the thickness of the substrate to be adapted to the battery's future use. For example, to reduce the quantity of energy stored in several batteries produced according to the invention, or to make it uniform, the thickness of the second electrode can be reduced to an identical thickness for all the batteries.

In all cases, the substrate is not completely removed in order to contribute to the process of storage of electrochemical energy. Keeping the interface between the electrolyte and the substrate, as proposed here, enables the mechanical integrity of the battery to be preserved while it is charged and/or used.

BRIEF DESCRIPTION OF THE ILLUSTRATIONS

Other details and characteristics of the invention will be revealed from the following description, which is given with reference to the following appended figures. Identical, similar or equivalent portions of the various figures have the same references, to make it easier to go from one figure to another.

The various portions represented in the figures are not necessarily represented at a uniform scale, in order to make the figures more readable. The marks given in the figures are orthogonal.

DETAILED DESCRIPTION OF PARTICULAR EMBODIMENTS

Several methods of production of a battery or of a microbattery of the all-solid type are presented below.

A first production method may consist of a first step consisting in preparing a substrate made of an active material, or able to form an electrode, intended to be used as a support for the production of an electrochemical cell of an all-solid battery. An electrochemical cell includes at least one anode and one cathode, separated by an electrolyte. A proportion of the substrate will be used as an electrode of the electrochemical cell.

Substrate or support 10 is produced from an active material, i.e. such that at least one atom or ion can be inserted in the material comprising substrate 10, and such that a proportion of the substrate can be used as an electrode. Its structure may possibly be deformed to encourage ions or atoms to be inserted. The atoms or ions can be of the following types: H, Li, Be, Mg, Na, K.

Substrate 10 can be produced from a conductor or semiconductor material, such as for example silicon, germanium or carbon.

Figure 1A:
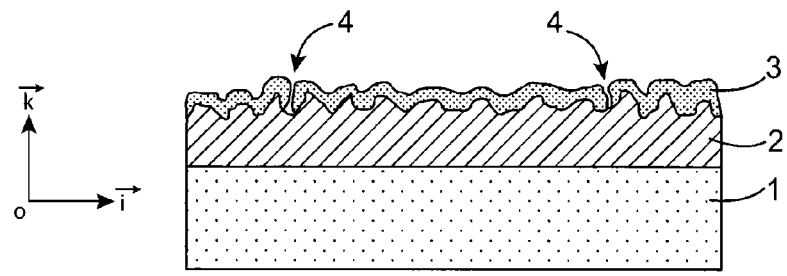
FIGS. 1a and 1b represent the deposit, in the form of a layer, of an electrolyte containing flaws, due to the surface condition of the support.
Figure 1B:
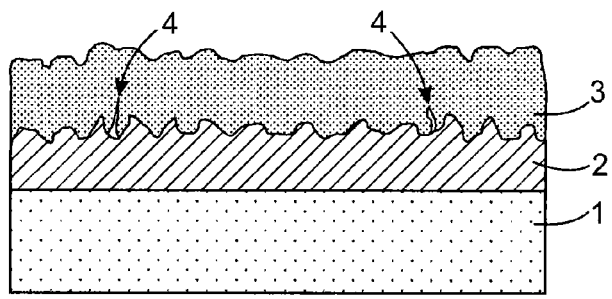
Figure 2A:
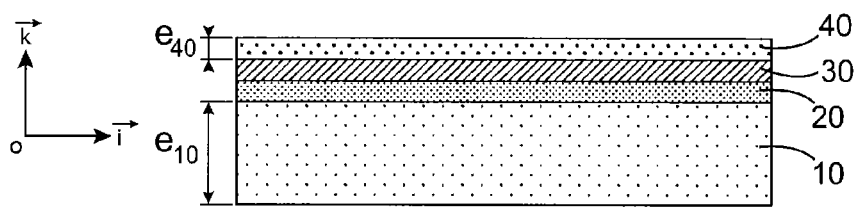
FIGS. 2a to 2e represent a first method of production of an all-solid microbattery according to the invention.
Figure 3A:
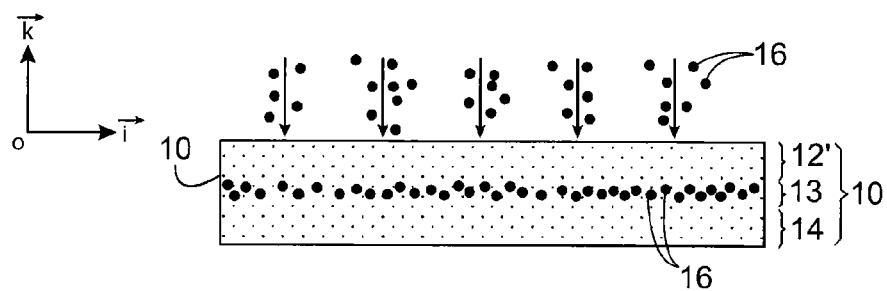
FIGS. 3a to 3d represent a second method of production of an all-solid microbattery according to the invention.

Thickness $e_{10}$ of substrate 10 can be greater than 10 µm, and can advantageously be between 500 µm and 700 µm (FIGS. 2a and 3a). More generally, the thickness of the substrate can correspond to the thicknesses of the wafers conventionally used in the microelectronics fields. Thickness $e_x$ of an element x is, according to the present document, the distance separating two opposite main surfaces of the said element, in a direction parallel to axis $(0;\vec{K})$ shown in the present figures.

According to the production method described here, substrate 10 is produced from silicon and shaped so as to form a layer, the thickness e10 of which is equal to 700 μm (FIG. 2a). At least one surface of the substrate is treated such that it has a surface roughness or RMS of between about ten and several nanometers, preferably less than 10 nanometers or 1 nanometer.

An electrolyte 20 is deposited in the form of a solid layer on a planarised main surface of substrate 10. The topology relief or surface roughness of this surface is less than 10 nanometers, to encourage the uniform deposit of electrolyte 20 in the form of a layer, having no flaws or very few flaws. An electrolyte 20 can therefore cover the planarised surface of substrate 10 uniformly, with a minimum quantity of deposited material. In other words, thickness e20 of electrolyte 20, which is required to cover completely the previous surface of substrate 10, is less than the thicknesses habitually used to form an electrolyte of an all-solid battery or microbattery.

Thickness $e_{20}$ of electrolyte layer 20 can be between 10 nm and 500 nm for a battery. In the present application an electrolyte defines a layer capable of insulating two electrodes electronically which is permeable to the diffusion of at least one ion or atom between the said electrodes.

Electrolyte 20 can be deposited using several deposition techniques, for example a technique of the PVD, or CVD, or PECVD, or Spin Coating, or Electrodepositon, or Sol-Gel, or Spray coating, or other coating technique type, etc.

Electrolyte 20 can be produced from at least one of the following materials: LiPON, LISIPON, LLTO, LISON.

Thickness $e_{20}$ of LiPON electrolyte 20 is, in the context of the present example, equal to 500 nm.

A second solid layer, ultimately intended to be used as a first electrode 30, for example as an anode, covers electrolyte 20. One of the above deposition techniques can be used to this end. The properties of this layer are similar to those of the substrate, i.e., electrically conductive, and allowing the diffusion or emission of at least one atom or ion, as above. It can be produced from at least one of the following materials: lithium, $LiCoO_2$, $LiMn_2O_4$, $V_2O_5$, $LiV_2O_5$. It can be between 100 nm and 10 μm thick.

According to the present example, first electrode 30 is produced from lithium and deposited by thermal vacuum evaporation by Joule effect. Thickness $e_{30}$ of the deposited lithium is equal to 2 μm.

Due to the highly reactive properties of lithium with water, a bilayer 40 can cover first electrode 30 in sealed fashion. To absorb the mechanical stresses it can, for example, include a first layer of parylene several microns thick, for example 5 μm thick, covering the surface of the second electrode. To stop the diffusion of the water vapour, and form bilayer 40, a second layer of titanium several hundred nanometers thick, for example 500 nm, can cover the first layer.

Figure 2B:
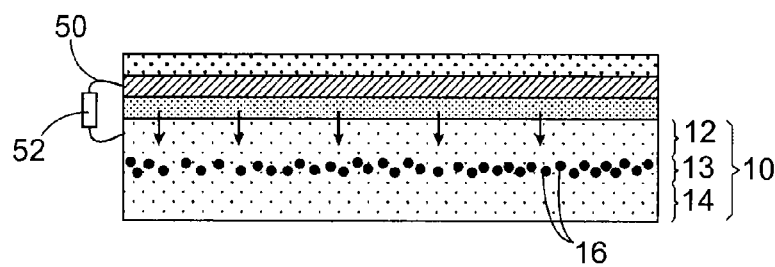

First electrode 30 and substrate 10 are then brought into electrical contact, by means of a conductive device. This device can include a conductor 50 and an electrical voltage generator 52 (FIG. 2b). An electrical voltage is applied between first electrode 30 and substrate 10 using electrical connections, to encourage the ions to diffuse from the first electrode into substrate 10. In the present example the lithium ions form a zone 13 implanted in substrate 10. Thickness e13 of this zone is between 1 and about ten nanometers.

The insertion of these ions creates locally a volume expansion of the substrate which is proportional to the quantity of ions inserted for each unit of volume. The quantity and depth of insertion of these diffusing elements is proportional to the value and duration of application of this voltage between substrate 10 and first electrode 30. The mechanical stresses created by the volume expansion embrittle substrate 10 in the area of embrittlement zone 13.

Figure 2C:
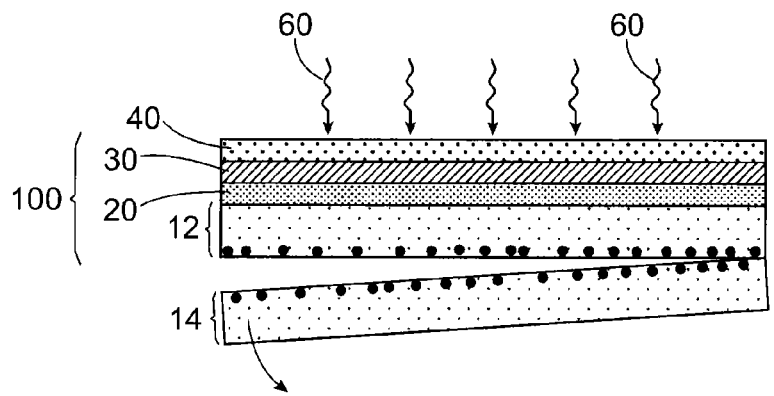

A mechanical stress can then be applied, in the area of this embrittlement zone 13, to cause a split (FIG. 2c). This stress may be accomplished by ultrasound-emitting means 60, as represented in FIG. 2c, or alternatively using a water jet or a laser beam directed towards the embrittled zone. Portion 14 of substrate 10 is then separated from the multi-layer structure obtained.

According to one alternative, the surface of substrate 10, opposite the surface in contact with electrolyte layer 20, can be polished or alternatively etched to a desired depth, equal to the above thickness ranges. The thickness of substrate 10 can be between 500 μm and 700 μm.

Remaining portion 12 of substrate 10 therefore forms the second electrode of an electrochemical cell 100, including electrolyte layer 20 and first electrode 30 (FIG. 2c). This cell 100 can be between 100 nm and 10 μm thick.

Electrochemical cell 100 can be immersed in a resin 70, for example an epoxy resin, to protect from damage due to the external environment, such as for example mechanical impacts and/or chemical attacks.

Figure 2D:
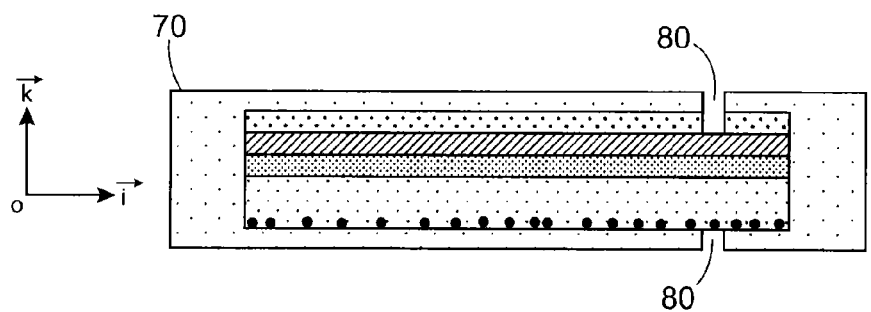

Resin 70 can be pierced in one or more surfaces (together with bilayer 40), to create at least two vias 80, forming entrances to the electrodes of electrochemical cell 100 (FIG. 2d).

Figure 2E:
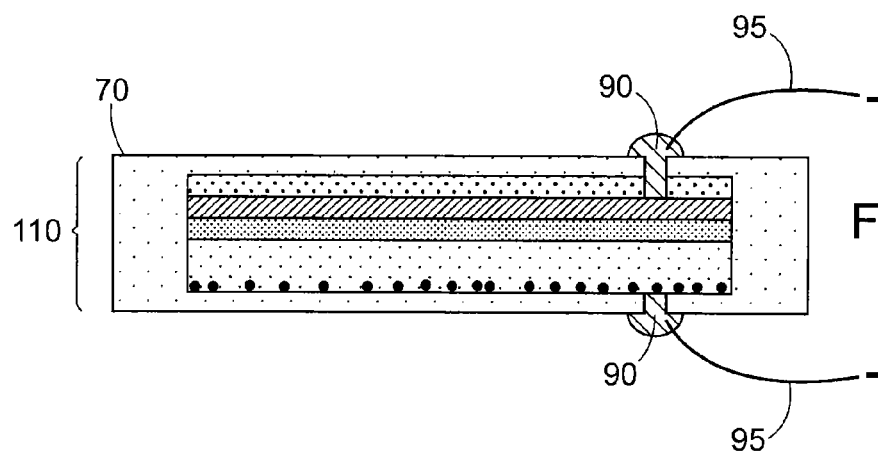

These vias can be filled up or in by a conductive material 90, such as for example a conductive adhesive CE 3103 WLV manufactured by HENKEL (FIG. 2e). Connection wires 95 can be soldered on to conductive material 90. Wires 95 are electrically conductive, and can connect battery 110 to an electrical device which is not represented in the figures.

Another example of production of an all-solid battery is described below.

According to a first step a substrate with a similar composition and shape to that of above substrate 10 is subjected to an ion implantation, for example of hydrogen ions 16, to form an embrittlement zone 13 (FIG. 3a). This delimits a second electrode 12' in contact with electrolyte layer 20, from the remainder of substrate 14.

Layers 20, 30 and possibly 40 are deposited on substrate 10 in the same way as above.

Figure 3B:
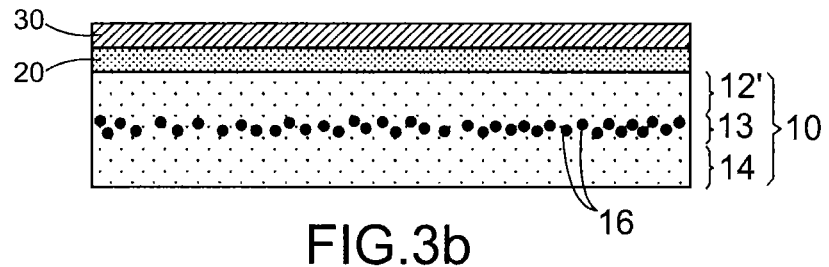

According to one alternative, a layer of LLTO (Lithium Lanthanate Titanium Oxide) 500 nm thick can be used as electrolyte 20, and a layer of $LiCoO_2$ 2 μm thick can act as electrode 30 (FIG. 3b).

Figure 3C:
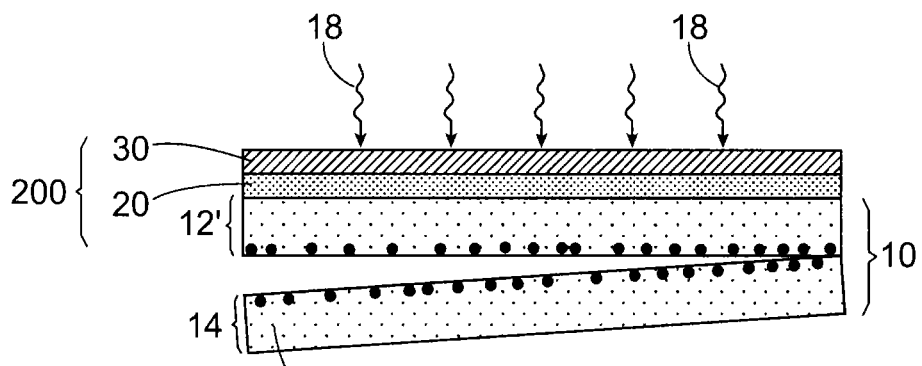

This multi-layer structure is then subjected to a heat treatment 18 of several hundred degrees, for example 600° C., to allow substrate 10 to split in embrittlement zone 13 and, possibly, to crystallise first electrode 30 (FIG. 3c).

Figure 3D:
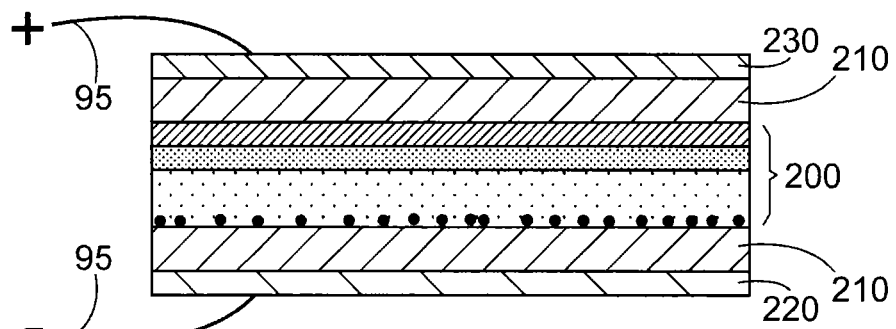

Layers 12', 20 and 30 then form an electrochemical cell 200. This can be at least partially moulded or encapsulated in a material 210 (FIG. 3d). Material 210 can form a water vapour diffusion barrier and can be electronically conductive, such as for example an anisotropic conductive adhesive 210 CE 3126 manufactured by HENKEL, of the ACF type ("Anistropic Conducting Film"), or alternatively an anisotropic conductive adhesive of the ACP type ("Anistropic Conducting Paste" or ink).

Material 210 can allow an electrical contact to be made and a first conductive element 220 to be held facing second electrode 12'.

Similarly, a second conductive element 230 can be in electrical contact and held facing first electrode 30. These conductive elements can be aluminium sheets. The adhesion can be accomplished by hot pressing.

Connection wires 230 can be soldered on to conductive materials 220. Wires 230 are electrically conductive, and can thus enable battery 200 to be connected to an electrical device which is not represented in the figures.

Some or all of the above production steps can be accomplished in a primary vacuum, for example of 1 mbar, in particular to limit the presence of water in the structure of one of the above batteries.

Advantageously, microelectronics production techniques can be used to form a multi-layer structure (100, 200), as above, in the area of a wafer, which can possibly be divided subsequently into multi-layer sub-structures.

In both embodiments described above, portion 14 of substrate 10 can be used once again after a surface treatment step, to form a multi-layer structure once again.

The production costs can be reduced by this means.

The methods described above for production of an all-solid battery or microbattery, have the following advantages:
  reduced thickness of electrolyte with improved power characteristics;
  reduction of the overall thickness of the component with improved flexibility and integration;
  possibility of reusing the same substrate several times, with reduction of the production costs;
  reduction of the number of deposition steps, with reduction of the production costs.

The invention claimed is:

1. A method for producing a battery, the method comprising:
  producing, against a substrate made of a conductive or semi-conductive material able to form an electrode, at least one solid electrolyte layer;
  producing a first electrode in contact with the solid electrolyte layer;
  forming, in the substrate, an embrittlement zone by a technique of atom implantation or, alternatively, by a technique of diffusion of ions derived from the first electrode such that the embrittlement zone comprises one or more ionic and/or atomic species;
  thinning the substrate by separating along the embrittlement zone such that at least a portion of the substrate, which is in contact with the solid electrolyte layer, forms a second electrode, which has a thickness of less than or equal to approximately one tenth of an initial thickness of the substrate and less than 10 μm; and
  producing an electrically conductive material positioned against the first electrode and against the second electrode.

2. The method according to claim 1, further comprising:
  prior to the producing of the electrically conductive material, depositing at least one protective layer, covering at least the first electrode.

3. The method according to claim 2, where the protective layer comprises a material which is impervious to water vapour.

4. The method according to claim 1, further comprising:
  after the thinning of the substrate, encapsulating at least a portion of an assembly comprising the second electrode, the solid electrolyte layer and the first electrode, in an electrically insulating material.

5. The method according to claim 4, further comprising:
  after the encapsulating, producing at least one first electrical contact electrically connected to the first electrode and at least one second electrical contact electrically connected to the second electrode, wherein the first and second electrical contacts traverse at least the electrically insulating material.

6. The method according to claim 1, wherein the conductive material is held on the electrodes by an intermediate layer made of an anisotropic conductive material.

7. The method according to claim 1, wherein the embrittlement zone in the substrate is formed by the technique of diffusion of ions derived from the first electrode.

8. The method according to claim 7, wherein the diffusion of ions derived from the first electrode is accomplished by applying an electrical voltage between the first electrode and the substrate.

9. The method according to claim 1, wherein the thinning of the substrate is implemented by at least one technique selected from the group consisting of splitting, polishing, laser cutting, cutting by water jet, wet etching, and dry etching.

10. The method according to claim 1, wherein the embrittlement zone is formed before the production of the at least one solid electrolyte layer.

11. The method according to claim 1, wherein the embrittlement zone is formed after the production of the at least one solid electrolyte layer.

* * * * *